(12) United States Patent
Schelberg et al.

(10) Patent No.: US 7,343,945 B2
(45) Date of Patent: Mar. 18, 2008

(54) MILLING SYSTEM AND METHOD

(75) Inventors: Karl-Heinz Schelberg, Frankenau (DE); Jurgen Mathee, Frankenau (DE); Joe Karkosch, Palatine, IL (US); John R. Kochanski, Palatine, IL (US)

(73) Assignee: Nomis LLC, Hampshire, IL (US)

( * ) Notice: Subject to any disclaimer, the term of this patent is extended or adjusted under 35 U.S.C. 154(b) by 66 days.

(21) Appl. No.: 11/195,962

(22) Filed: Aug. 3, 2005

(65) Prior Publication Data

US 2005/0263215 A1    Dec. 1, 2005

Related U.S. Application Data

(62) Division of application No. 10/291,238, filed on Nov. 8, 2002, now abandoned.

(60) Provisional application No. 60/344,570, filed on Nov. 9, 2001.

(51) Int. Cl.
*B27C 5/00* (2006.01)

(52) U.S. Cl. ............... 144/144.1; 144/144.51

(58) Field of Classification Search ............ 144/134.1, 144/135.2, 136.1, 136.95–139, 144.1, 144.51, 144/145.1; 409/180–182, 178, 179; 33/562, 33/563, 565, 626, 628, 638
See application file for complete search history.

(56) References Cited

U.S. PATENT DOCUMENTS

| | | | | |
|---|---|---|---|---|
| 4,281,694 A | * | 8/1981 | Gorman | 144/154.5 |
| 4,319,615 A | * | 3/1982 | Ditmanson | 144/144.1 |
| 4,353,672 A | * | 10/1982 | Smith | 409/97 |
| 5,052,454 A | | 10/1991 | Meinhardt | |
| 5,183,373 A | | 2/1993 | Floyd, Jr. | |
| 5,493,767 A | | 2/1996 | Susnjara | |
| 5,524,684 A | * | 6/1996 | Stuckel | 144/144.51 |
| 6,722,051 B2 | * | 4/2004 | Carlson et al. | 33/562 |

FOREIGN PATENT DOCUMENTS

| | | |
|---|---|---|
| DE | 100 26 028 | 5/2000 |
| DE | 200 22 529 | 5/2000 |

* cited by examiner

*Primary Examiner*—Shelley M. Self
(74) *Attorney, Agent, or Firm*—Reinhart Boerner Van Deuren P.C.

(57) ABSTRACT

A milling system for milling patterns into a workpiece is disclosed. The system comprises a baseplate having an aperture and a template disposed within the aperture and positionable in a plurality of registrated orientations relative to the baseplate. The baseplate is formed of two separable baseplate parts. A system for vertically supporting a rotary cutting tool is also disclosed. The system comprises a base, a plurality of posts extending upwardly from the base, and a tool support for supporting the rotary tool. The tool support has a plurality of sleeves, one associated with each of the posts. The sleeves slidably receive respective ones of the posts. The tool support further includes springs for biasing the tool support away from the base.

6 Claims, 12 Drawing Sheets

Fig. 2
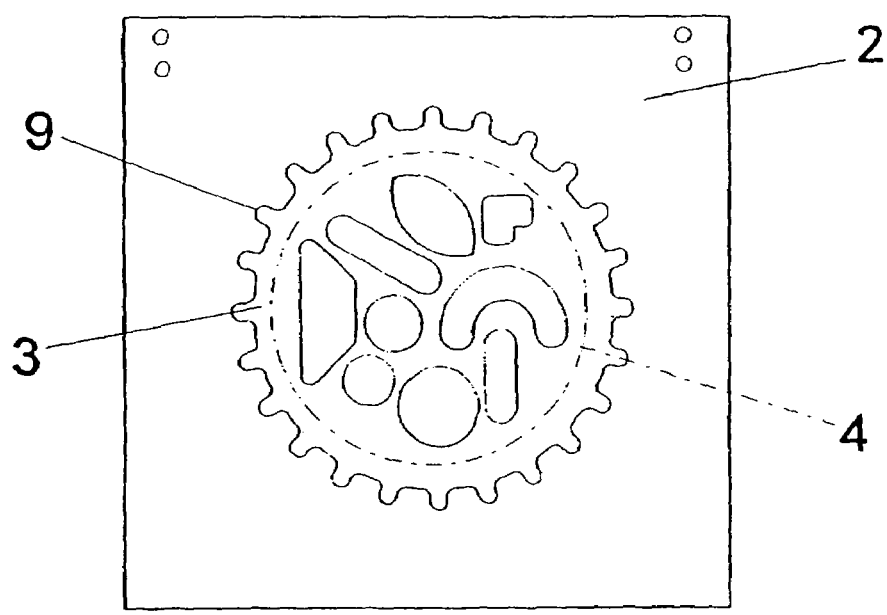
Fig. 3     Fig. 4     Fig. 5
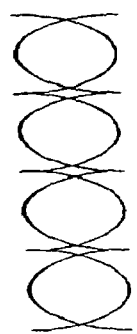 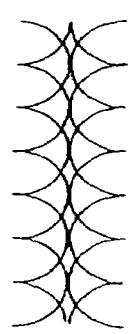 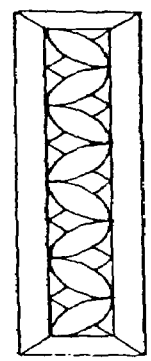
Fig. 6     Fig. 7     Fig. 8
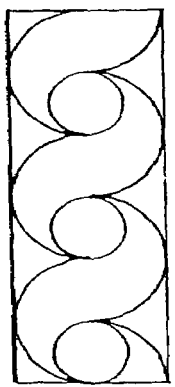 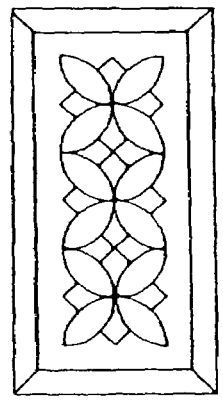 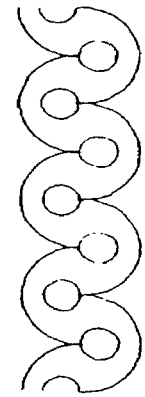

Fig. 9
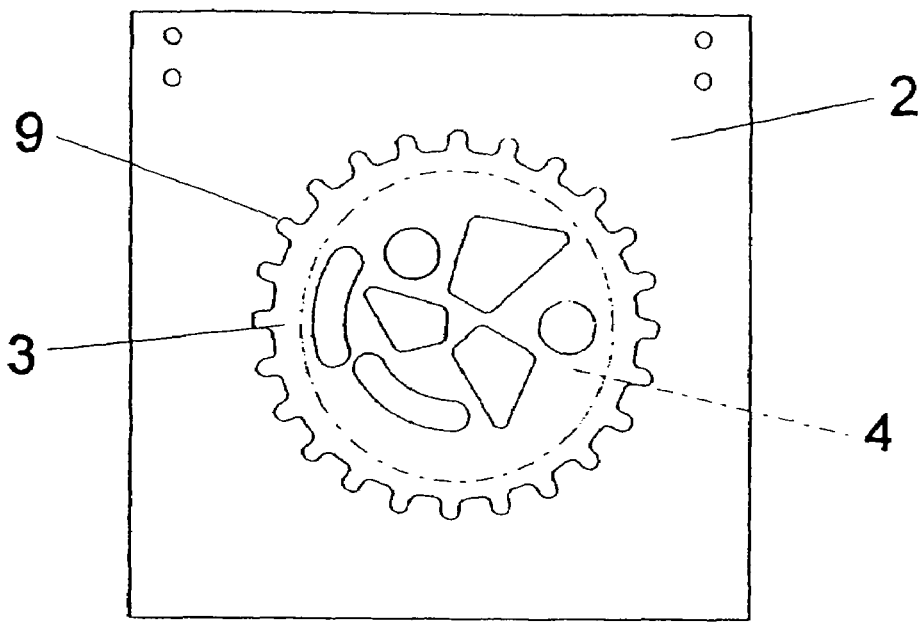
Fig. 10  Fig. 11  Fig. 12
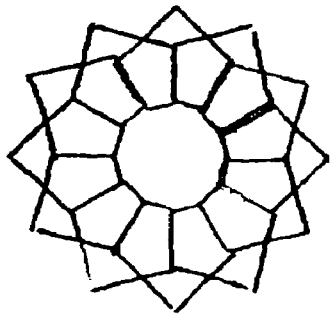 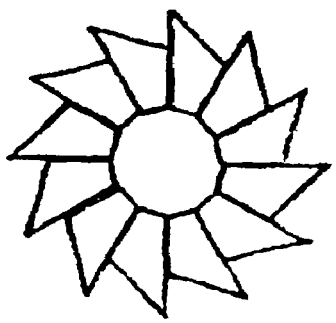 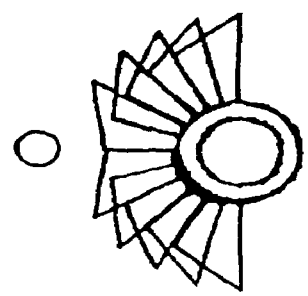
Fig. 13  Fig. 14  Fig. 15
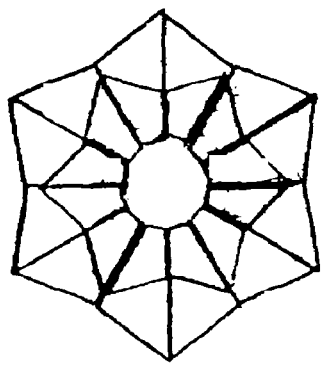 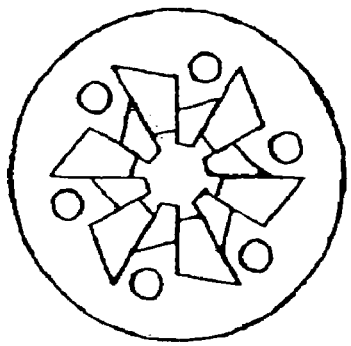 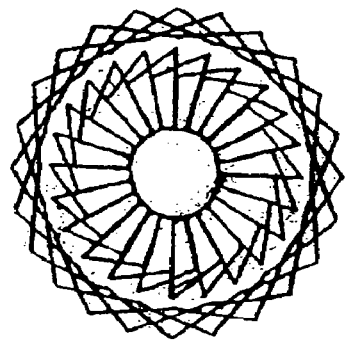

MILLING SYSTEM AND METHOD

CROSS-REFERENCE TO RELATED APPLICATIONS

This patent application is a divisional of U.S. Non-Provisional Patent Application, Ser. No. 10/291,238, filed Nov. 8, 2002 now abandoned. This application claims the benefit of U.S. Provisional Application No. 60/344,570, filed Nov. 9, 2001.

FEDERALLY SPONSORED RESEARCH OR DEVELOPMENT

Not Applicable.

BACKGROUND OF THE INVENTION

Using milling systems when routing or inlay-milling a wide variety of patterns with the aid of hand router is known. These templates are used as interior and exterior templates. A template must be made for each pattern to be milled. The milling process then runs as follows. The template is affixed to the workpiece. Then by means of a stop collar attached to the hand router, the contours of the template are traced (for exterior templates: tracing of the template's exterior contour; for interior templates: tracing of the template's interior contour). More complex milling work is possible with the aid of a CNC milling machine (computer-controlled NC machine).

Known milling systems (interior templates, exterior templates) have the disadvantage that a separate milling system must be created for each pattern to be milled. With these templates, only the one designated pattern can be milled. This applies to the exterior templates as well as to the interior templates. The production of such templates is very time-consuming and expensive. Moreover, it requires, in addition to the appropriate manufacturing methods, a certain creativity and special skills in the field of ornamentation of workpieces.

The quality of the milling depends directly on the execution of the template. Thus, uneven areas on the cutouts (for interior templates) and on the template periphery (for the exterior templates) are transferred directly to the milling.

The disadvantage of exterior milling systems is that only the exterior perimeter of a pattern can be cut out. And the disadvantage of interior milling systems is that the complete milling of a complex pattern is not possible since not all details can be cut away from the milling system. This is due to the dropping out of certain partial zones of the template due to a possibly unavoidable overcutting in the milling pass (for example, in a template for milling out the uppercase letter B). When using a router 11 with tracing collar 16 and router bit 17 and the corresponding template, the undesirable overcutting problems appear in the middle milled region of the "B." Another example of this problem is a template for milling several circles of different diameter about a common center. Here, only the largest diameter could appear on the template, since the smaller template sections would merely drop out.

More extensive pattern structures (for instance, a rose with petals) can only be milled out with the aid of computerized NC machines (CNCs). For medium-scale woodworking shops, use of these computerized NC machines is usually cost-prohibitive. In addition, such machines can only be used in workshops. Due to their significant weight, they cannot be used on-site. Moreover, as a rule, for reasons of cost, the use of such NC machines is not possible by the nonprofessional hobbyist.

Additionally, when milling, it has been difficult to accurately and comfortably hold and control the milling tool.

SUMMARY OF THE INVENTION

According to the present invention, an object is realized by a device associated with a method having the characteristics of a milling system for the milling of simple up to complex complementary and expandable patterns with a router guided therewith, the router adapted to rotate a router cutting bit, comprising: a base plate; a template supported by the base plate and movable relative to the baseplate about an adjustment axis defined by the template, the template having a plurality of registered positions relative to the base plate, the template moving a constant predetermined distance relative to the axis between adjacent registered positions; at least one patterned recess formed into the template offset from the adjustment axis, the patterned recess defining an aesthetic shape adapted to be routed into the workpiece, the pattern recess adapted for receipt of the router cutting bit and defining a guide wall surface for guiding the router cutting bit when inserted therein; and a lock between the template and the base plate for holding the template relative to the base plate in the registered positions.

Therefore, the object of the present invention is a milling system, associated with a method for the milling of simple up to complex complementary and expandable patterns from a workpiece 7 by means of a router 11 with tracing collar 16 and router bit 17, wherein a few basic patterns in the form of pattern cutouts (examples) 4 are used to create a very large number of different pattern combinations and variants.

The invention pertains to a device in the form of a milling system 12 associated with a method for the milling of simple up to complex, complementary and expandable patterns from a workpiece 7 by means of a router 11 with tracing collar 16 and router bit 17. The milling system 12 has a base plate 2 and a movable template 3 that contains sectors 8 with pattern cutouts (examples) 4 in defined positions.

By shifting, turning, and rotating the parts of the milling system 12 after each milling process, particularly the movable template 3, several of the pattern cutouts (example) 4 in the template 3 can be used to mill out a great number of pattern combinations and pattern variations.

The milling of complementary patterns is also possible, since the pattern to be milled can be broken down in accordance with a defined system and cut out with the pattern cutouts (example) 4 of the movable template 3.

Different templates are compatible and can complement each other to form new patterns. Due to the use of a guide bar 13, several patterns to be milled can be expanded in the X-direction and in the Y-direction.

The invention pertains to a device in the form of a milling system, associated with a method for milling simple to complex, complementary and expandable patterns from a workpiece by means of a router 11 with tracing collar 16 and router bit 17 according to the preamble of claim 1. A pattern can be understood as the following: shapes, images, symbols, letters, numbers, ornaments in the manner of chip carvings, decorations, etc.

The user of the router 11 with tracing collar 16 and router bit 17 will be able, by means of the milling system 12 according to the present invention and the selection of only a few pattern cutouts (example) 4 at specified positions on the movable template 3, to create several different, complex, complete, complementary patterns whose shape and size can be expanded indefinitely, merely by sliding, turning and rotating the movable template 3 after each milling process. Thus, it will be possible to mill from one to a significant number of pattern combinations, and also to mill pattern variations. The milling of carved ornamentation (notch cutting) is also possible. Due to an appropriate placement of the pattern cutouts (example) 4 on the movable template 3, it is possible to expand the size of the pattern being cut (e.g., a rose with petals, where additional outer, supplemental petals can be added on). Partial milling of a pattern is also possible (e.g., ¼ or ½-pattern) (FIG. 12).

Due to the use of additional, compatible templates and also of a guide bar 13 adjustable in the X-direction and in the Y-direction, the size or shape of a pattern can also be varied.

This provides the user of this milling system with the opportunity to form milled patterns like those that are only possible with a CNC machine. The time-consuming, and thus expensive, production of individual milling systems is now unnecessary for the user. If the hobbyist and recreational user is lacking in the required creativity and milling experience, particularly in regard to ornamentation of workpieces, then by using this milling system, he can quickly and easily form elegant patterns in workpieces.

An additional advantage over conventional milling systems is that the user now has the possibility of independently varying the pattern to be cut. Furthermore, by breaking down the pattern to be milled into a corresponding number of basic patterns on the milling system in the form of pattern cutouts 4 in the movable template 3, the milling of complex and complete patterns is possible. In addition, due to this breaking down of the subsequent milling process, any potentially undesirable overcutting during the course of the milling can be prevented (for example, the letter 'B').

By means of an appropriate selection of the router bit 17 and of the tracing collar 16, the appearance of the milled pattern can be varied once again. Insert and recess milling of patterns is possible simultaneously with this milling system 12. The milling systems are designed so that an expansion or complementation of patterns is possible through the use of additional, compatible movable templates 3 equipped with different pattern cutouts (example) 4, or through the use of a guide bar 13 which is adjustable both in the X-direction and the Y-direction.

Therefore, the task of the invention concerns a versatile, easy-to-handle, low-cost, and expandable milling system which avoids the disadvantages of known milling systems.

A preferred embodiment of the milling system of the invention and also additional advantageous embodiment examples of the invention are illustrated in principle in the drawings and will be described below in greater detail.

It is a further object of the invention to provide a milling system for milling patterns into a workpiece. The system comprises a baseplate having an aperture and a template disposed within the aperture. The template is positionable in a plurality of registrated orientations relative to the baseplate, wherein the baseplate is formed of two separable baseplate parts.

It is a still further object of the invention to provide a system for vertically supporting a rotary cutting tool. The system comprises a base, a plurality of posts extending upwardly from the base, and a tool support for supporting the rotary tool. The tool support has a plurality of sleeves, one associated with each of the posts. The sleeves slidably receiving respective ones of the posts. The system further includes means for biasing the tool support away from the base.

These and other aspects and attributes of the present invention will be discussed with reference to the following drawings and accompanying specification.

BRIEF DESCRIPTION OF THE DRAWINGS

FIG. 2, a top view of a preferred embodiment of the milling system according to the present invention, with examples of pattern cutouts in the movable template;

FIGS. 3 to 8, a selection of combination milling patterns and variants for the use of the sample pattern cutouts according to FIG. 2 of the milling system according to the present invention, while still using the guide bar adjustable in the X-direction and Y-direction according to FIG. 1;

FIG. 9, a top view of an additional, preferred embodiment of the milling system according to the present invention, with additional examples of sample cutouts in the movable template;

FIGS. 10 to 15, a selection of milling pattern combinations and variants for the use of the pattern cutout examples according to FIG. 9 of the milling system according to the present invention;

BRIEF DESCRIPTION OF THE INVENTION

Figure 1:
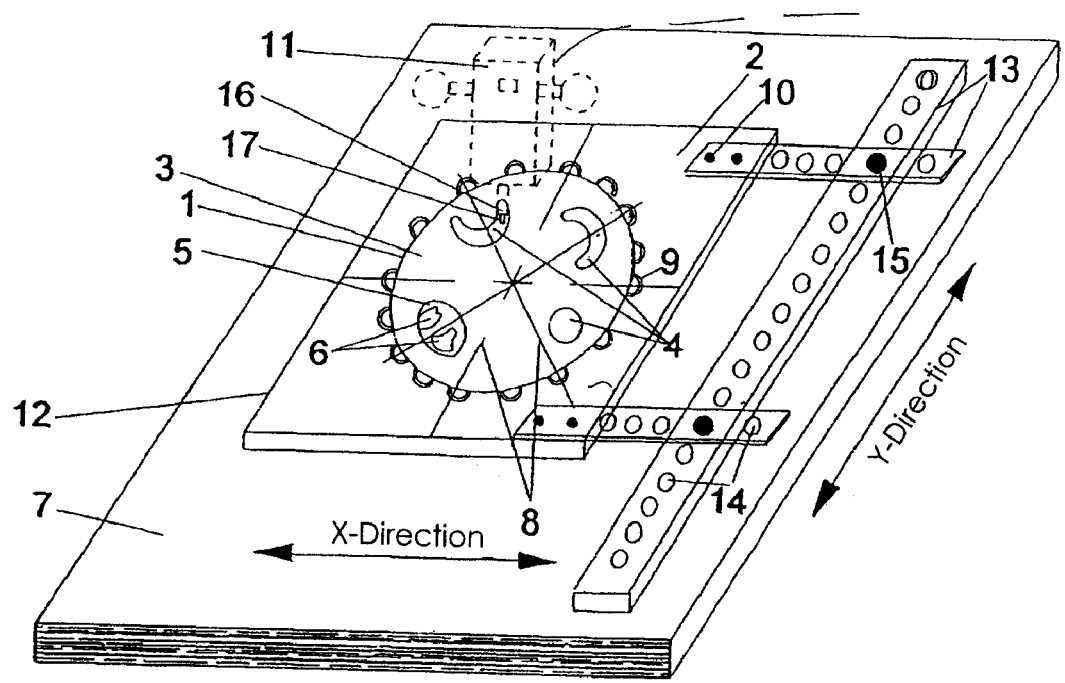
FIG. 1, a perspective view of a preferred embodiment of the milling system according to the present invention, with fitted, movable template and guide bar adjustable in the X-direction and Y-direction.
Figure 16:
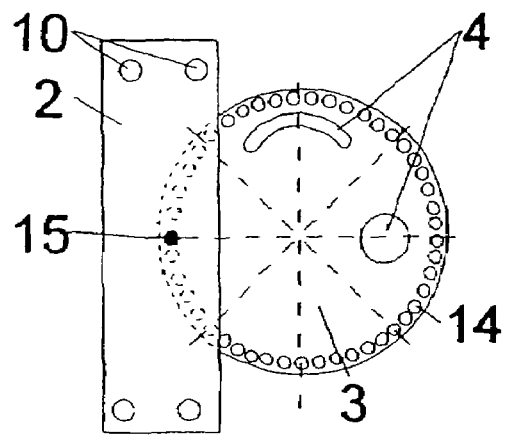
FIG. 16, a top view of an additional embodiment of a milling system with movable template in a base plate and also an alternative locking means.
Figure 17:
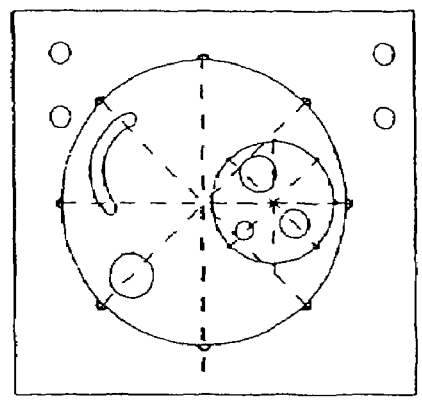
FIG. 17, a top view of a milling system with movable template, in which, in turn, one or more movable templates are installed.
Figure 18:
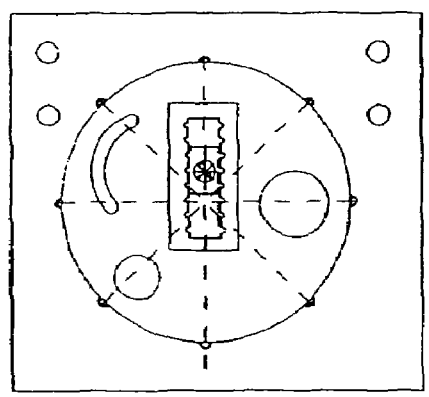
FIG. 18, a top view of a milling system with movable template, in which, in turn, one or more rectangular movable templates are installed, in which, again in turn, a movable template has been installed.
Figure 19:
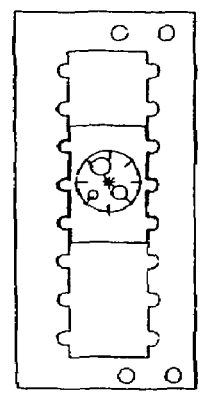
FIG. 19, a top view of a rectangular milling system with movable, rectangular template, in which, in turn, a movable template has been installed.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 20:
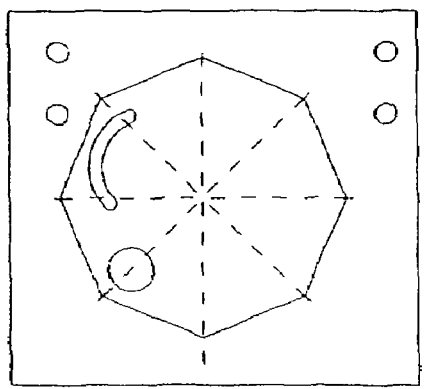
FIG. 20, a top view of a milling system with movable, rectangular template.
Figure 21:
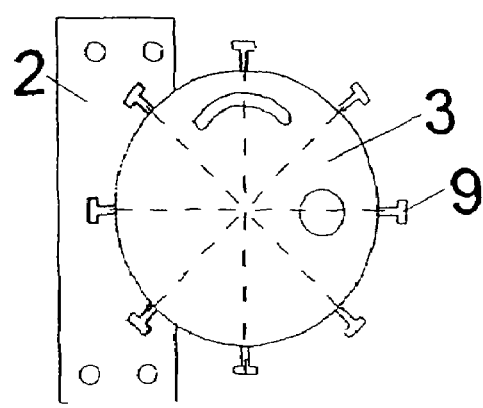
FIG. 21, a top view of an additional embodiment of a milling system with movable template in a base plate, and also an additional, alternative locking means.

The preferred embodiment of the milling system according to the present invention (FIG. 1) consists of a base plate 2 and also at least one movable template 3. The base plate can be made from, e.g., wood, aluminum, hard plastic, hard paper or another nondeformable material. The thickness of the base plate 2 and also the given template 3 should be ideally about 2-20 mm, depending on application. In this regard, both parts should have the same material thickness. In the preferred embodiment of the milling system according to the present invention, a cutout 1 has been formed in the base plate 2 in order to hold the movable template 3. The movable template 3 in the preferred embodiment of the milling system according to the present invention is circular, and fits exactly into the circular cutout of the base plate 2 when inserted. Alternatively, in an additional embodiment of the milling system according to the present invention, the movable template 3 can be formed as a polygon (FIG. 20). Accordingly, the base plate 2 will then also contain polygonal cutouts. A means for locking the plate in place (base plate/movable template) 9 is provided. This makes it possible to lock the movable template 3 for one milling pattern in a defined position to the base plate 2. Depending on the pattern to be cut, the movable template 3 is divided into several same sectors 8 of the same size. At least one pattern cutout (example) 4 is incorporated as a cutout at one precisely defined area of the movable template 3. The position of the movable template 3 can be changed after each milling process, by sliding, turning, or rotating the template within the base plate 2 about an adjustment axis. The adjustment axes, which are depicted in FIG. 1 by a "cross hairs" on the template 3, are located generally radially inwardly of the pattern cutouts 4. Therefore, the pattern cutouts 4 in FIG. 1 are each offset from one of the adjustment axes. The number of the pattern cutouts (example) 4 depends on the size of the movable template 3 and also on the complexity of the pattern to be milled. In order to attain additional versatility in the pattern, an insert 5 (i.e., an insertion part) can be installed into a pattern cutout to form reduced-size cutouts 6.

The templates, in particular the movable template 3, are designed so that they are mutually compatible and will complement each other for the cutting of new patterns. However, this only applies to templates with the same-size template. In one particular refinement of the milling systems according to the present invention, through the use of a guide bar 13 adjustable in the X- and Y-directions, an expansion of the patterns is possible. On the base plate 2 of the milling system according to the present invention, there is a means 10 provided for securing of this guide bar. The guide bar 13 can be locked in place, for example, by use of a locking bolt 15. When this locking feature is used, the locking bolts 15 are inserted into the holes drilled for the locking unit 14. The distance between the drilled holes for the locking unit 14 is a defined value, in order to ensure the precise movement of the milling system in the X- or Y-directions. FIGS. 16-21 show additional, particularly useful possibilities for embodiments of the milling system according to the present invention.

Selection of the pattern to be milled is made by using a pattern selection sheet included for each milling system. Thus, the user can obtain information concerning which pattern cutouts (examples) 4 are needed for forming the desired pattern.

In the simplest case, the actual milling process proceeds as follows: in the preferred embodiment of the milling system according to the present invention, the base plate 2 is placed upon the workpiece, suitably aligned, and then locked in place by using threaded clamps, for example. The rotatable template 3 must remain movable mobile in this case. The size of the tracing collar 16 and also the router bit 17 to be used are suggested on the router 11 for each pattern. Then, the cutting depth of the router 11 is set. Next, the router 11 equipped with tracing collar 16 and router bit 17 is guided along the inside edges of the pattern cutouts (example) 4 belonging to the pattern in the template 3.

Figure 22:
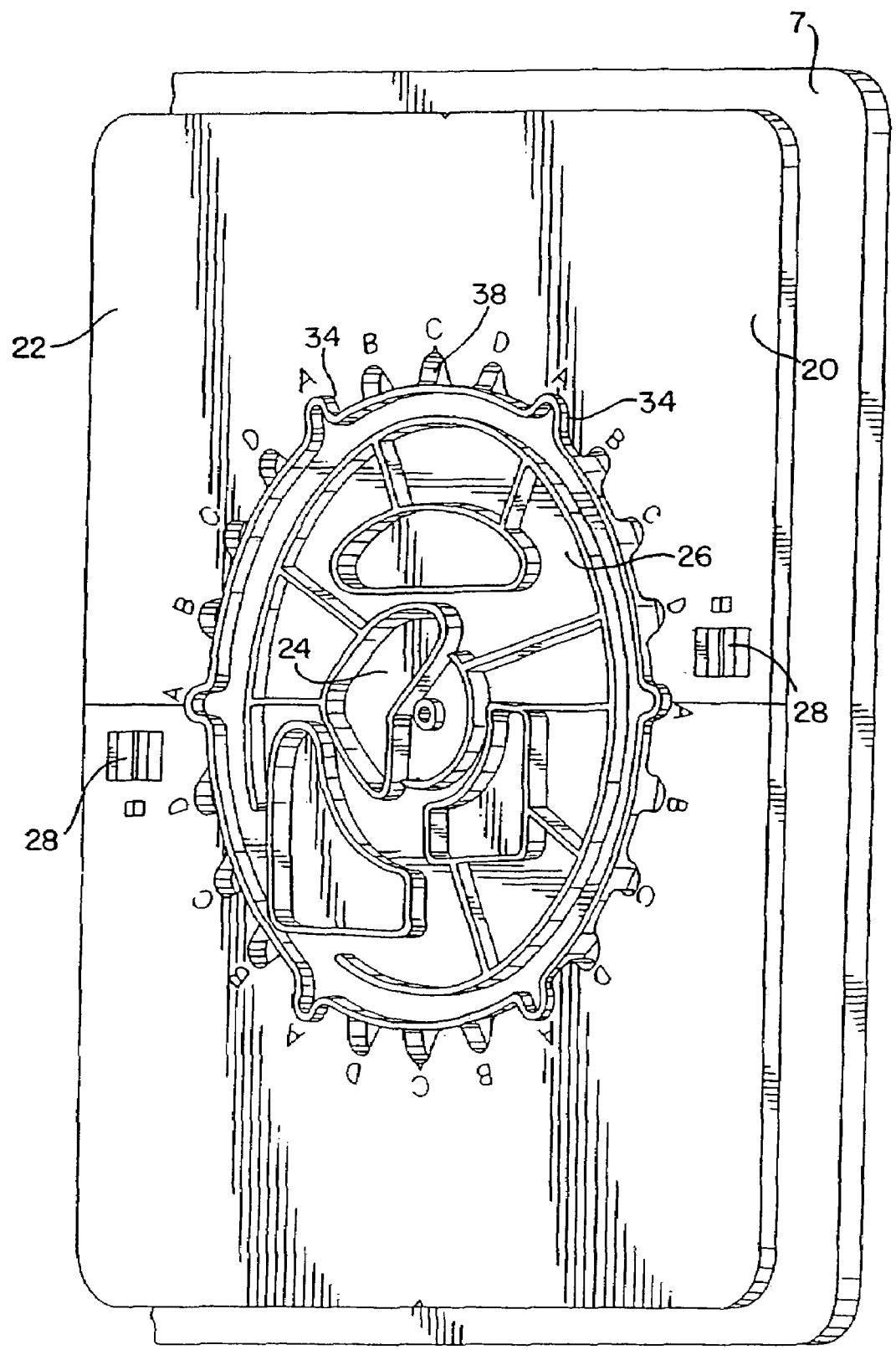
FIG. 22 is a perspective view of a particular embodiment of a milling system according to the invention.

According to the specified cutting pattern, the movable template 3 is moved into a new position after each milling process by shifting, turning, sliding or rotating the template about an adjustment axis. For example, the moveable template 3 is moved into the new position by moving the template about the adjustment axis such that the protrusions 36 seated in the recesses labeled with an "A" in the template 22 of FIG. 22 are now seated in recesses labeled "B" in the template 22. These steps are then repeated until the desired pattern has been completely formed. For cutting particular patterns, often only partial segments of the pattern cutouts (example) 4 are needed. Based on the pattern selection sheet, the user will be able to obtain information indicating which partial segments of the pattern ring of the router are to be followed. FIG. 2 and FIG. 9 show top views of the preferred embodiment of the milling system according to the present invention, with examples of pattern cutouts (examples) 4 in the movable template 3 and also a small selection (FIGS. 3-8 and FIGS. 10-15) of patterns that can be cut with these templates. In the milling patterns according to FIGS. 3-8, a guide bar 13 is used in order to expand the milling pattern in the X- or Y-directions.

A preferred embodiment of the invention is described below.

A milling system 20 for milling patterns into the workpiece 7 is illustrated in FIGS. 22-25. The system 20 comprises a baseplate 22 having an aperture 24. The system 20 further includes a template 26 disposed within the aperture 24 and positionable in a plurality of registrated orientations relative to the baseplate 22.

Figure 23:
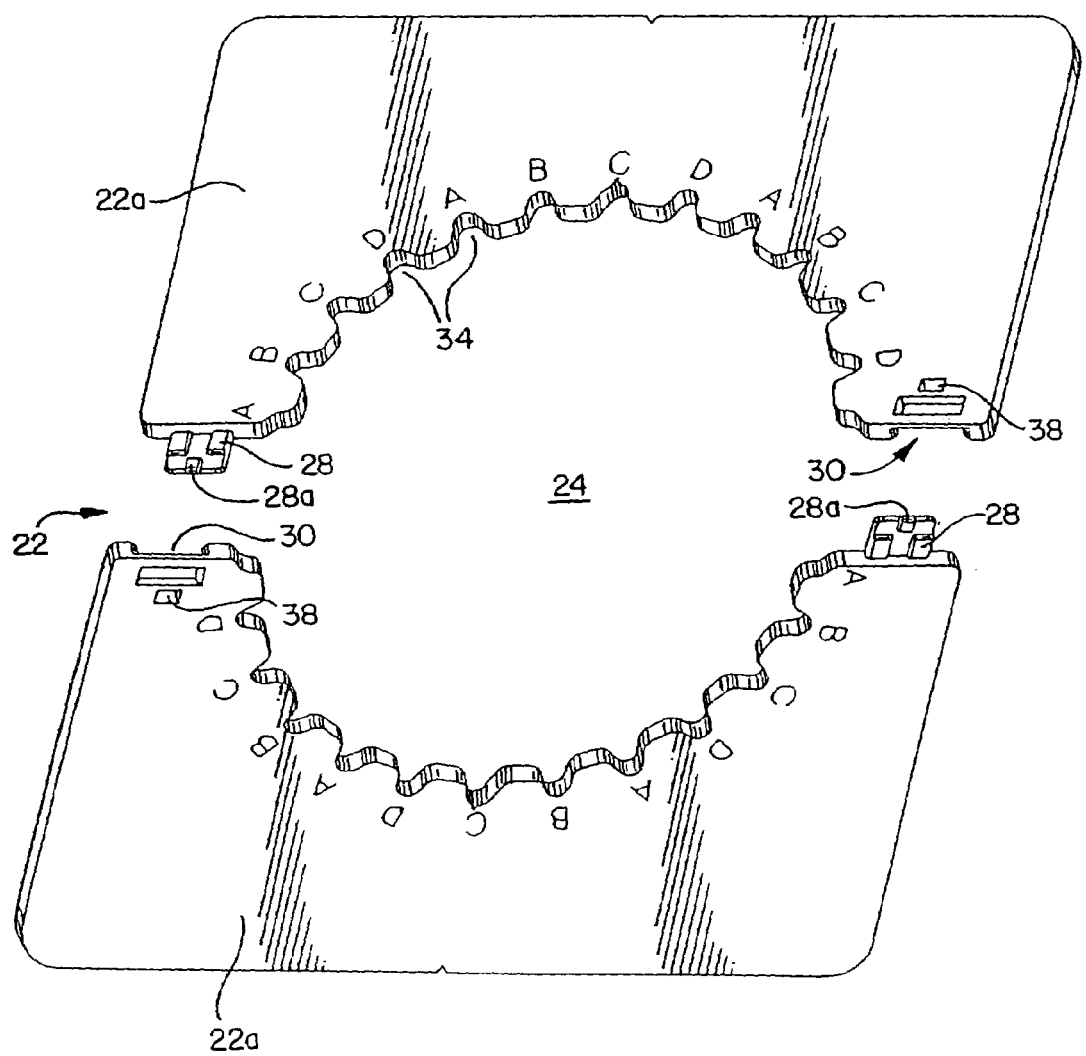
FIG. 23 is a perspective view of a baseplate of the milling system of FIG. 22.
Figure 24:
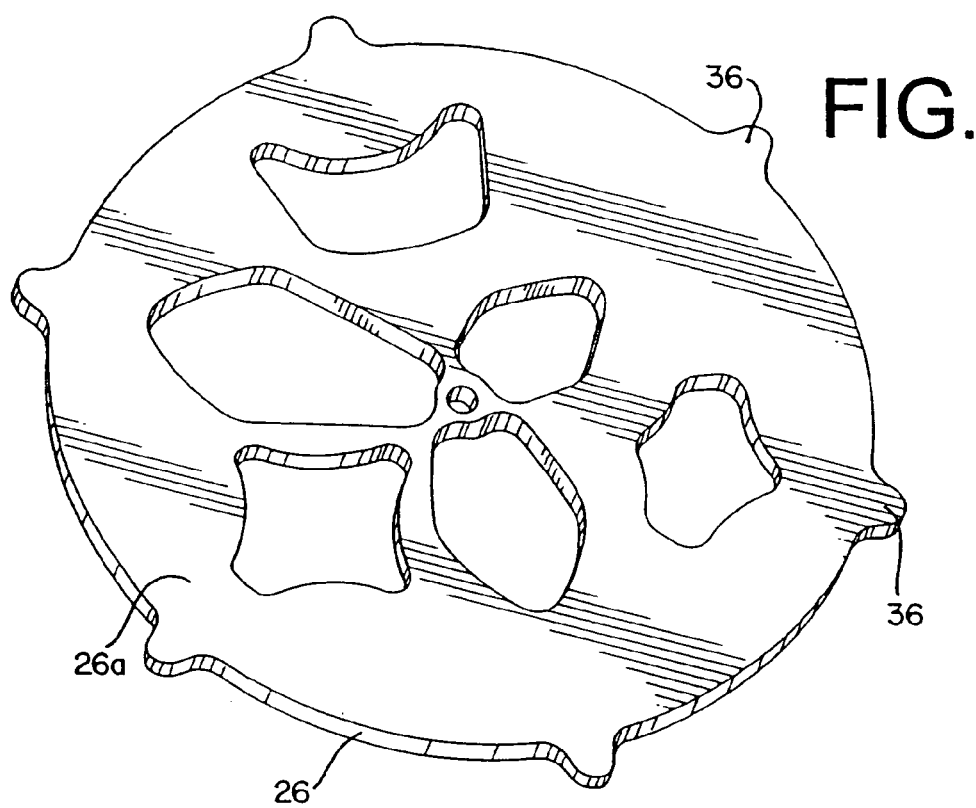
FIG. 24 is a perspective view of an upper side of a template of the milling system of FIG. 22.

Referring to FIG. 23, the baseplate 22 is formed of two separable, symmetrical baseplate parts 22a. The two baseplate parts 22a each include a tongue 28 on one of the parts 22a and a cooperative slot 30 in the other of the parts 22a to received the respective tongue 28, for interconnecting the parts 22a together. The tongue 28 has a raised detent 28a and the slot includes an aperture 30a to receive the detent 28a.

The baseplate 22 includes twenty-four recesses 34, which are sequentially labeled A, B, C, D. The template 26 includes six protrusions 36, which locate the template 26 relative to the baseplate 22.

The baseplate 22 includes opposing notches 38, and the template 26 has a center positioning aperture 24b for aligning the workpiece 7 with the milling system 20. Additionally, the baseplate aperture 24 has a beveled aperture surface 24a, and the template 26 has a cooperatively beveled outer surface.

The template has a plurality of pattern cut-outs 27. The template 26 further has an upper surface 26a and a lower surface 26b. The upper surface 26a is flush. The lower surface 26b has cored out segments to reduce material cost. The baseplate lower surface 26b is textured.

Figure 25:
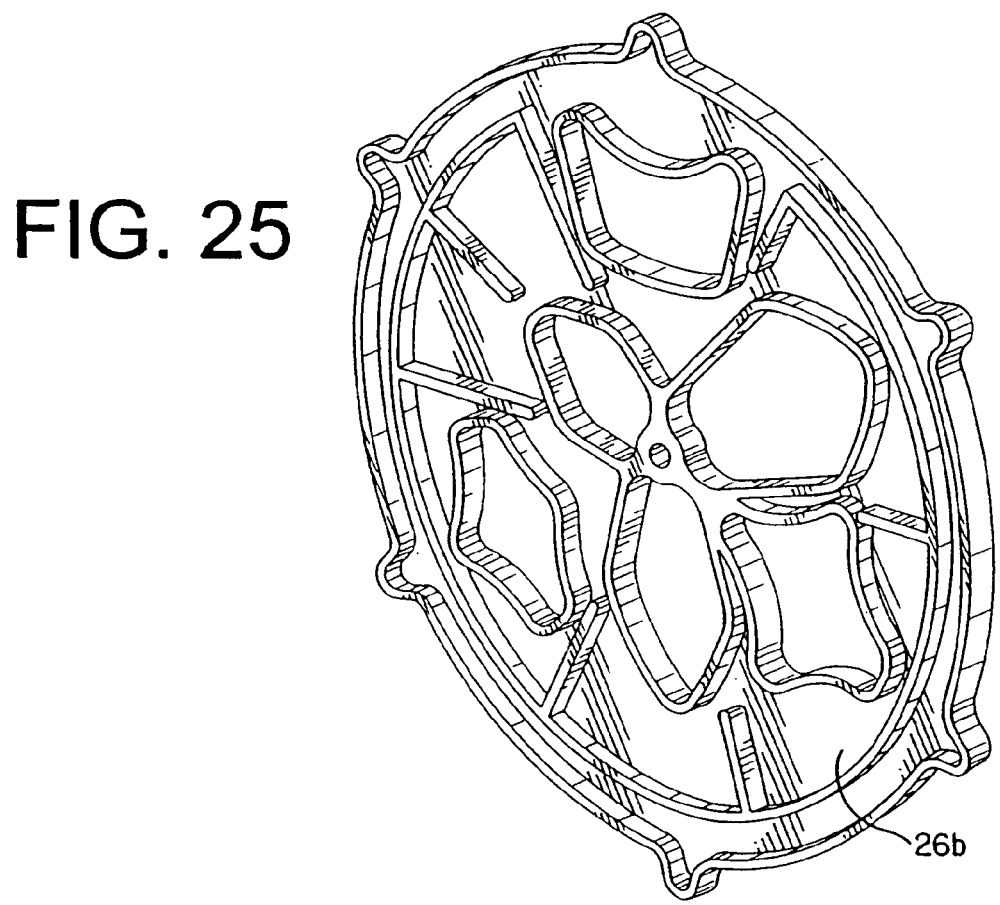
FIG. 25 is a perspective view of a lower side of the template of the milling system of FIG. 22.
Figure 25A:
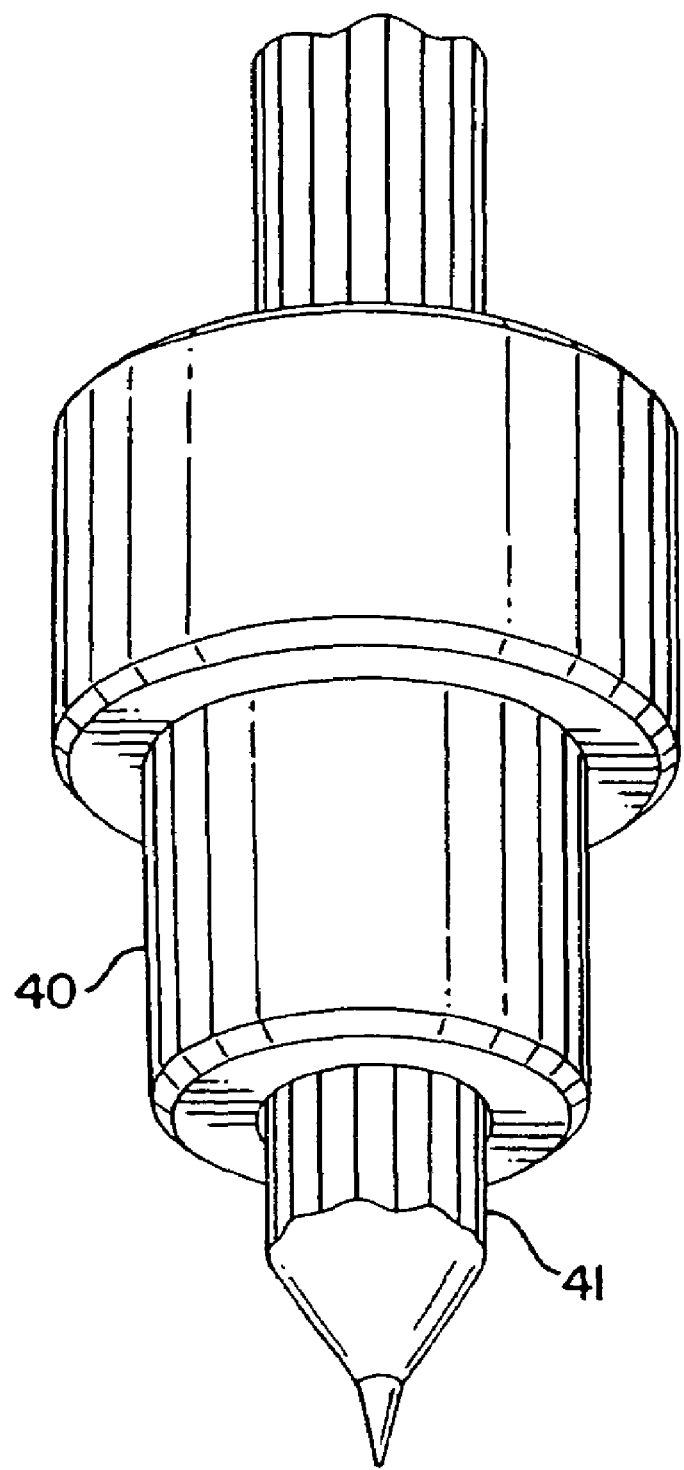
FIG. 25*a* is a perspective view of a pencil guide in accordance with the invention.
Figure 26:
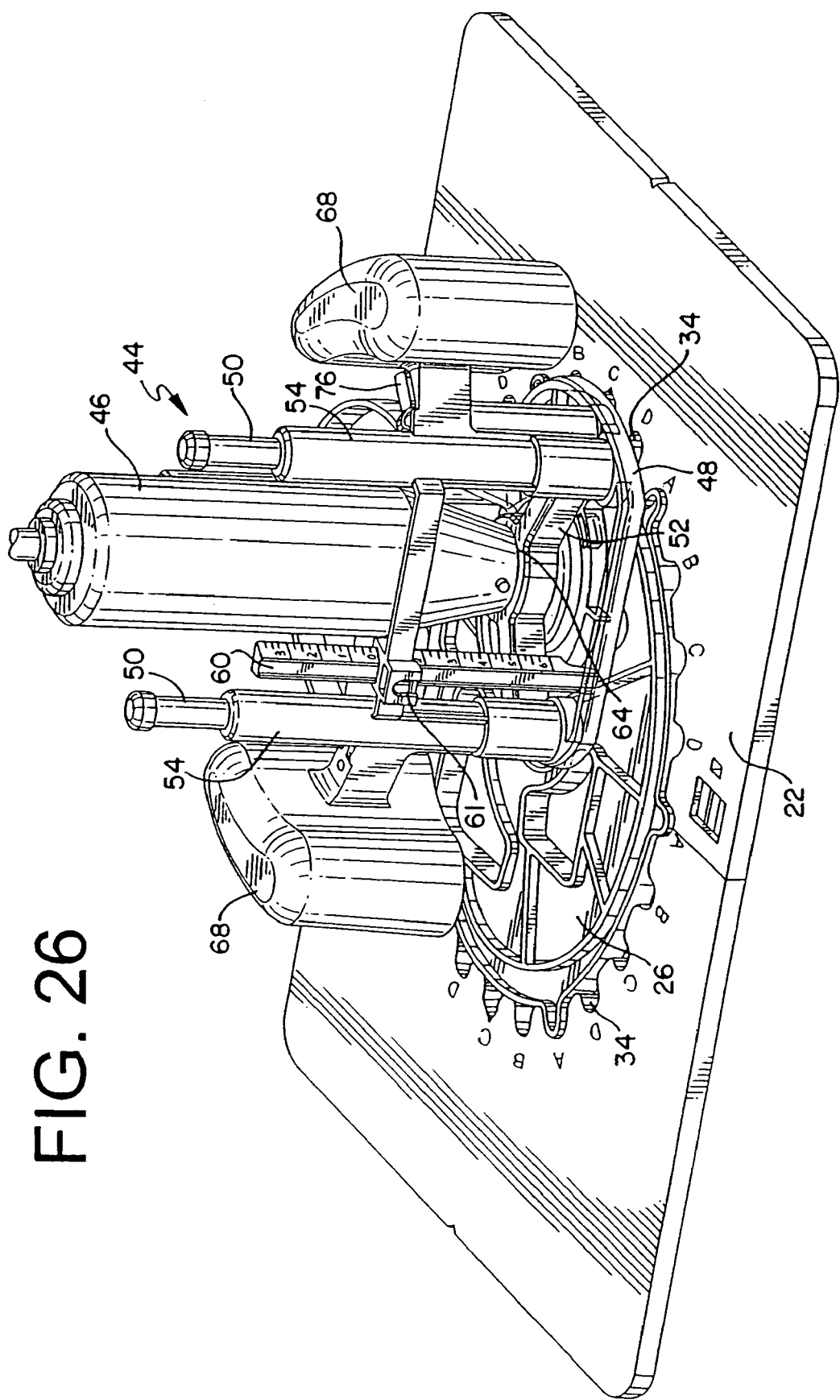
FIG. 26 is a perspective view of a system for vertically supporting a rotary tool in accordance with the invention.
Figure 27:
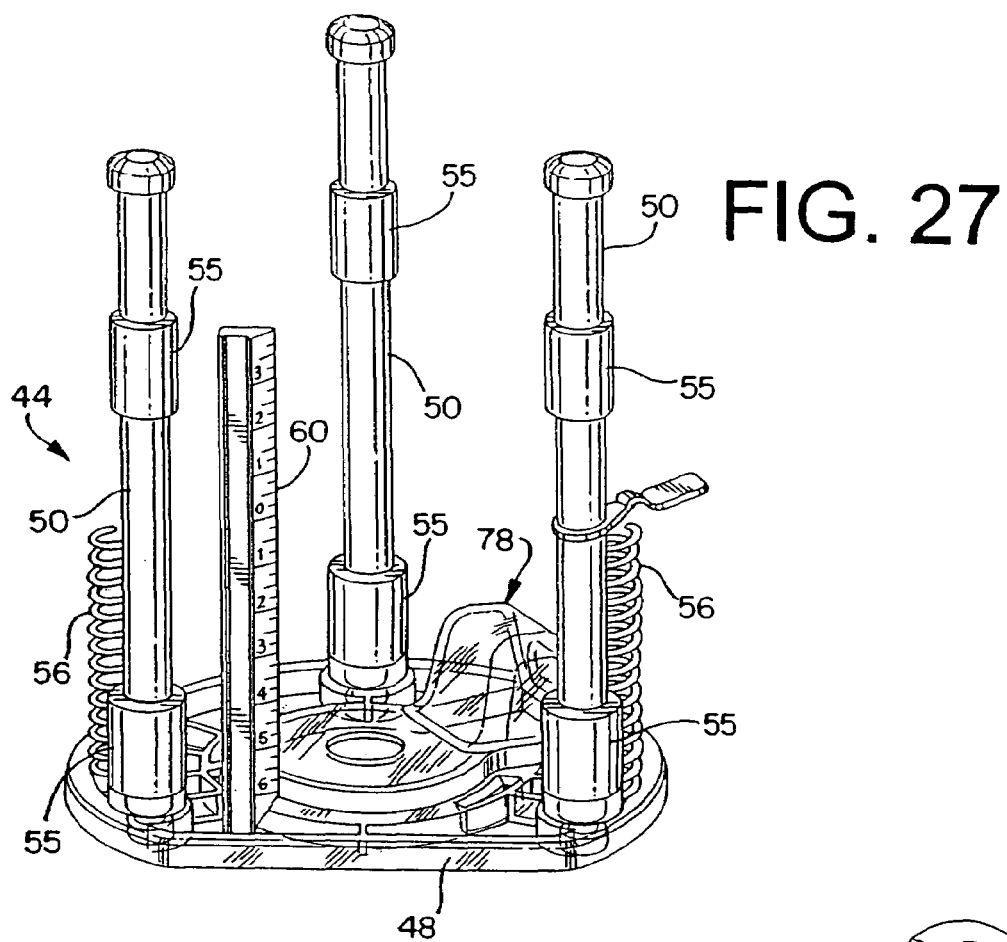
FIG. 27 is a perspective view of a baseplate of the system of FIG. 26.
Figure 28:
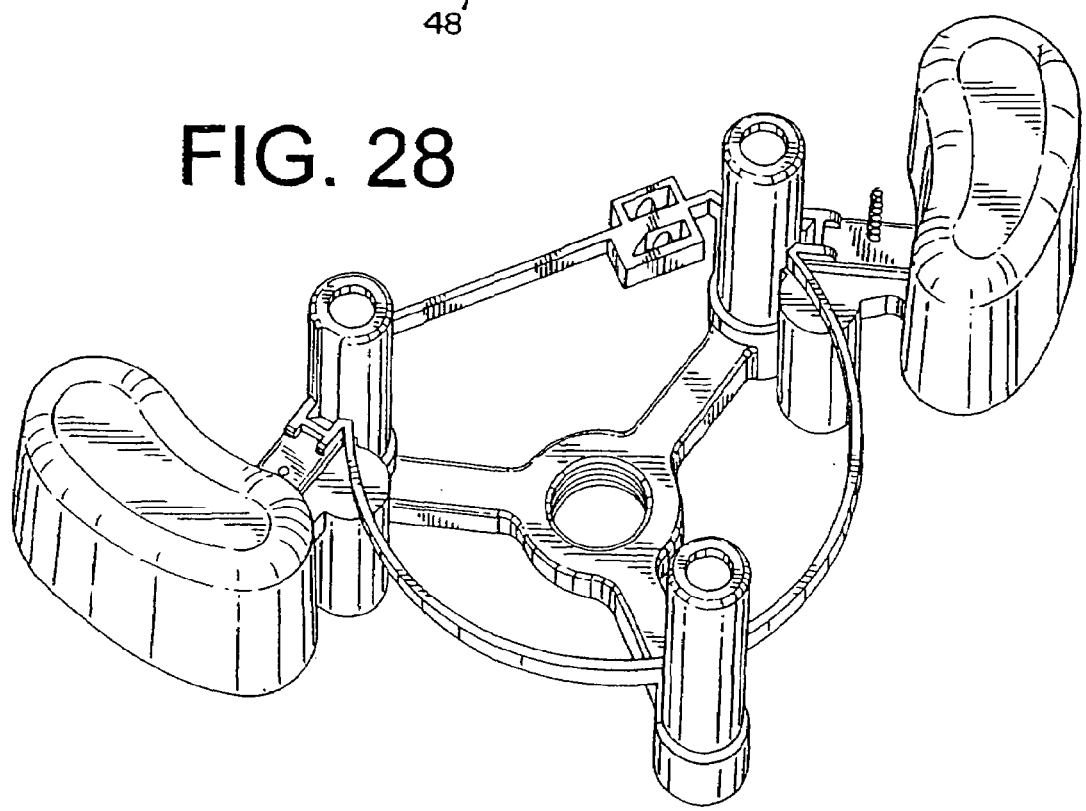
FIG. 28 is a perspective view of a tool support of the system of FIG. 26.
Figure 29:
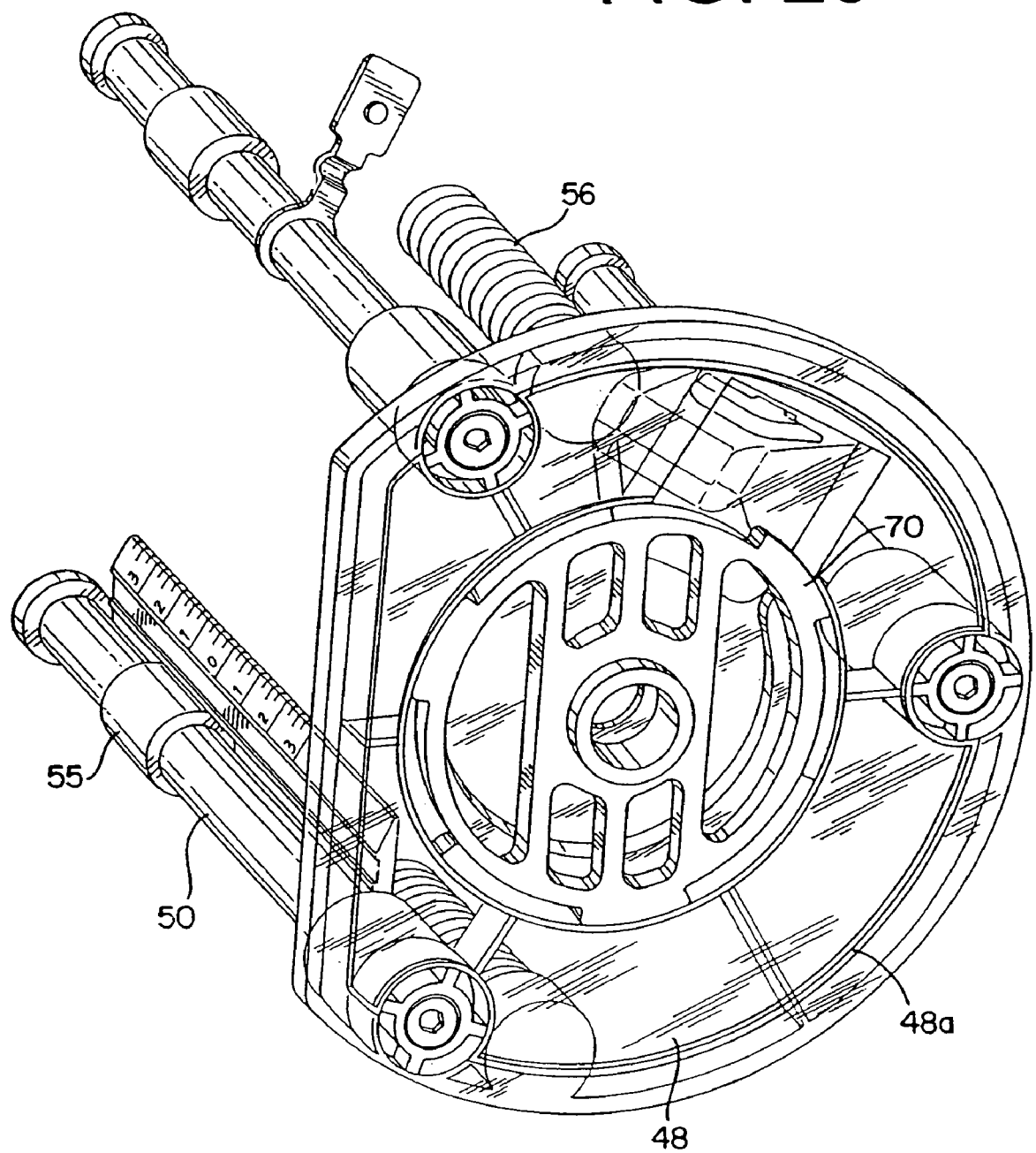
FIG. 29 is a perspective view of the tool support of FIG. 28, from its underside.

In order to view a resulting pattern before milling the workpiece 7, a pencil guide 40, illustrated in FIG. 25a, is provided. The pencil guide 40 holds a pencil 41, or other like writing instrument. With the pencil guide 40 and the pencil 41, one can trace the pattern on the workpiece 7. The pencil guide 40 has two diameters, to vary the distance the pencil 41 is spaced from the walls of the pattern cutout 27, and hence varies the resulting pattern.

A preferred embodiment of a system 44 for vertically supporting a rotary cutting tool 46 is illustrated in FIGS. 26-29.

The tool support system 44 comprises a transparent base 48 and a three posts 50 extending upwardly from the base 48. The base has a lower surface having two, generally circular ribs 48a (FIG. 29), raised approximately 1/20,000 of an inch. The ribs 48a raise the base away from the template 26, so as to prevent scratching of the base 48 and maintain its transparency. The periphery of the base 48 is also beveled, to permit it to smoothly slide over surface bumps.

The system 44 further includes a tool support 52 for supporting the rotary tool 46. The tool support 52 has a plurality of sleeves 54, one associated with each of the posts 50. Each of the sleeves 54 includes first and second bushings 55. The sleeves 54 slidably receive respective ones of the posts 50. The system still further includes two springs 56 disposed in respective spring sleeves for biasing the tool support 52 away from the base 48. The springs 56 each have a first end 56a disposed in the spring sleeve and a second end 56b engaging the base 48.

The system 44 also includes a gauge 60 having one end secured to the tool support 52 by a set screw 61 and the other end adapted to engage the base 48 for selectively limiting the travel of the tool support 52 towards the base 48, which sets the depth of cut into the workpiece 7. The gauge is graduated, to display the selected depth of cut.

The tool support 52 includes a threaded opening 64 to receive a threaded nose of the rotary tool 46. The tool support 52 also includes a pair of handles 68 for permitting a user to move the tool support 52 relative to the base 48.

Figure 30:
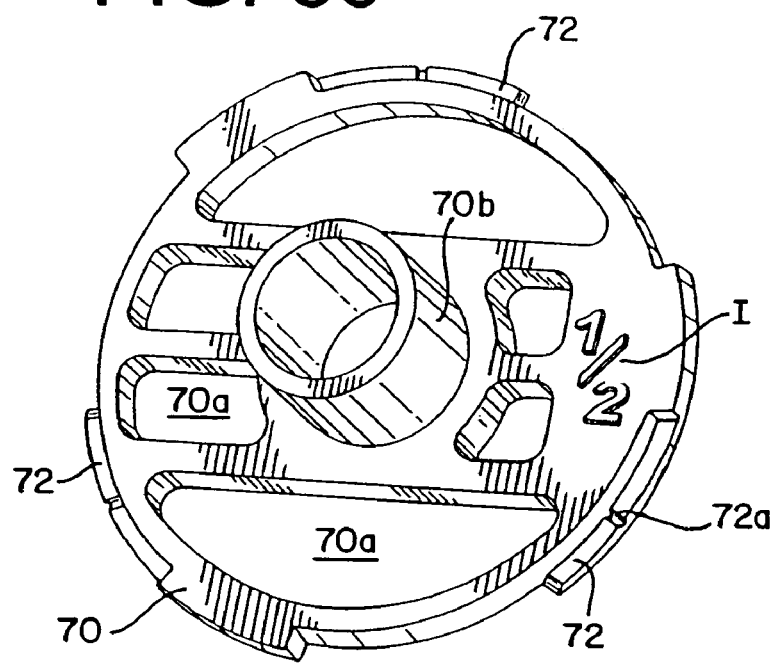
FIG. 30 is a perspective view of a guide bushing of the tool support of FIG. 29.
Figure 31:
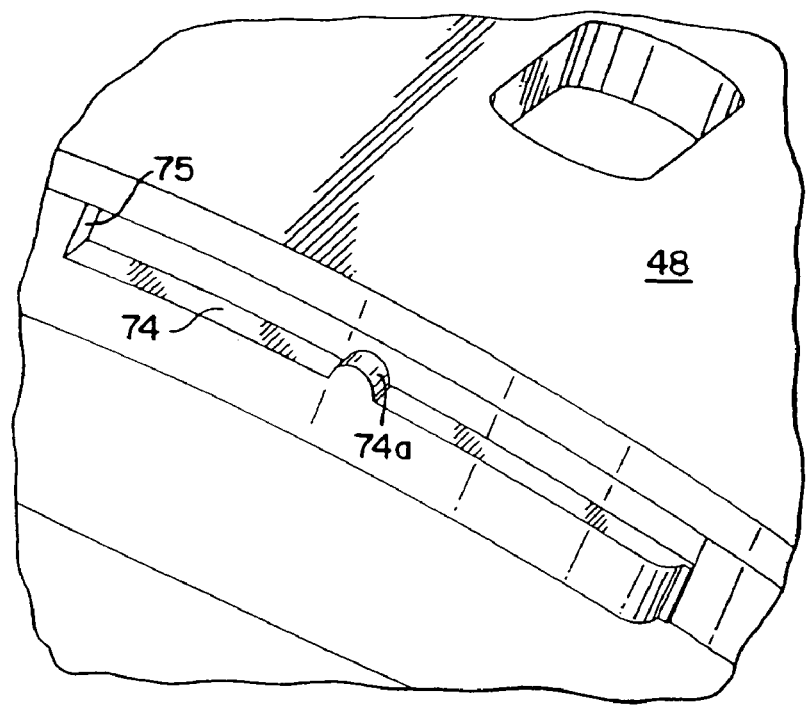
FIG. 31 is a perspective view of a portion of a base of the tool support of FIG. 29.

Referring to FIGS. 30 and 31, the base 48 includes a guide bushing 70 having a cylindrical nose 70b. The diameter of the cylindrical nose 70b determines the distance the tool bit is spaced from the walls of the pattern cutout 27, and hence affects the pattern milled in the workpiece 7. The diameter of the cylindrical nose 70b is identified by a molded indicia I (raised or depressed) on the surface of the guide bushing 70. The guide bushing 70 is easily removable and includes three tapered lips 72 to receive a respective one of three lips 74 on the base 48. Each of the bushing lips 72 includes a recess 72a to lockingly engage with a cooperating protrusion 74a on the base lip 74. A wall 75 prevents over-rotation of the guide bushing 70. Accordingly, the guide bushing 70 can readily be changed to one having a different nose 70b diameter without the need for special tools. The guide bushing 70 includes large openings 70a for visibility and to permit grasping to rotate the bushing 70. The guide bushing 70 further includes indicia indicating the circumferential dimension of the nose 70b.

The system 44 also includes a spring loaded release 76 for locking the tool support 52 in a position a selected distance relative to the base 48.

The base 48 further includes a vacuum attachment 78 to attach a vacuum device (not shown) to remove cuttings through the large openings 70a in the guide bushing 70.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A milling system for the milling of simple up to complex complementary and expandable patterns with a router guided therewith, the router adapted to rotate a router cutting bit said milling system, comprising:

a base plate defining a generally circular opening and a plurality of first recesses or first projections integrally formed into the baseplate and bounding the circular opening at equally spaced angular intervals about the circular opening;

a template interfitting with the circular opening of the base plate and angularly fixed to the baseplate when received into the circular opening, the template rotatable relative to the baseplate when lifted out of the circular opening about a center axis defined by the template, the template having a plurality of second recesses or second projections integrally formed into a generally circular surface of the template for interlocking with the first recesses or first projections to thereby define registered positions relative to the base plate, such that the template rotating a constant predetermined distance relative to the axis between adjacent registered positions;

at least one patterned recess formed into the template that is never symmetrically centered on the center axis when the template is interfitted with the baseplate, the patterned recess defining an aesthetic shape adapted to be routed into a workpiece, the pattern recess adapted for receipt of the router cutting bit and defining a guide wall surface for guiding the router cutting bit when inserted therein; and wherein engagement between the first recesses and the second projections or the first projections and the second recesses along a generally circular interface between the template and the base plate hold the template relative to the base plate in the registered positions.

2. The milling system of claim 1 wherein the milling system is free of screws between the template and the baseplate.

3. The milling system according to claim 1 comprising a plurality of movable templates that are interchangeable with the baseplate.

4. The milling system according to claim 1, further comprising a guide bar means for adjusting the baseplate linearly in the X- and Y-directions, wherein a pattern milling expansion is possible both in the X- and Y-directions.

5. The milling system according to claim 1, wherein the at least one patterned recess has an axis of symmetry about a radial line extending from the adjustment axis.

6. The milling system of claim 1, further comprising a routing bit of the router disposed in patterned recess for milling a pattern.

* * * * *